(12) United States Patent
Sakamoto et al.

(10) Patent No.: US 6,917,393 B2
(45) Date of Patent: Jul. 12, 2005

(54) LIQUID CRYSTAL DISPLAY DEVICE

(75) Inventors: Michiaki Sakamoto, Tokyo (JP); Yuichi Yamaguchi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 118 days.

(21) Appl. No.: 10/014,508

(22) Filed: Dec. 14, 2001

(65) Prior Publication Data

US 2002/0075424 A1 Jun. 20, 2002

(30) Foreign Application Priority Data

Dec. 15, 2000  (JP) ........................................ 2000-382472

(51) Int. Cl.⁷ ............................................. G02F 1/136
(52) U.S. Cl. ........................ 349/43; 349/53; 349/106; 349/111; 349/138; 349/42; 349/46; 349/52; 349/39
(58) Field of Search ............................. 349/42, 43, 46, 349/39, 53, 106, 111, 138, 122

(56) References Cited

U.S. PATENT DOCUMENTS

| | | | | | |
|---|---|---|---|---|---|
| 5,764,319 | A | * | 6/1998 | Nishihara ........................ | 349/8 |
| 5,926,235 | A | * | 7/1999 | Han et al. ....................... | 349/43 |
| 6,038,003 | A | * | 3/2000 | Kim .............................. | 349/43 |
| 6,057,896 | A | * | 5/2000 | Rho et al. ....................... | 349/42 |
| 6,124,909 | A | * | 9/2000 | Miyashita et al. ........... | 349/109 |
| 6,243,146 | B1 | * | 6/2001 | Rho et al. ....................... | 349/42 |
| 6,256,077 | B1 | * | 7/2001 | Baek ............................. | 349/43 |
| 6,262,784 | B1 | * | 7/2001 | Kim .............................. | 349/43 |
| 6,266,111 | B1 | * | 7/2001 | Kataoka et al. ............. | 349/113 |
| 6,287,899 | B1 | * | 9/2001 | Park et al. .................... | 438/149 |
| 6,300,152 | B1 | * | 10/2001 | Kim .............................. | 438/30 |
| 6,300,987 | B1 | * | 10/2001 | Jung ............................. | 349/39 |
| 6,335,276 | B1 | * | 1/2002 | Park et al. .................... | 438/648 |
| 6,380,559 | B1 | * | 4/2002 | Park et al. .................... | 257/59 |
| 6,522,369 | B2 | * | 2/2003 | Ohta et al. ..................... | 349/39 |
| 6,525,788 | B1 | * | 2/2003 | Nakagawa et al. ........... | 349/44 |

FOREIGN PATENT DOCUMENTS

| | | |
|---|---|---|
| JP | 5-232465 | 9/1993 |
| JP | 6-242433 | 9/1994 |
| JP | 8-122824 | 5/1996 |
| JP | 8-262489 | 10/1996 |
| JP | 8-313936 | 11/1996 |

* cited by examiner

Primary Examiner—Nathan J. Flynn
Assistant Examiner—Fazli Erdem
(74) Attorney, Agent, or Firm—McGinn & Gibb, PLLC

(57) ABSTRACT

There is provided a liquid crystal display device comprising a plurality of pixels arranged in a matrix form, each of the pixels including a pixel electrode formation area wherein a pixel electrode is formed and a thin film transistor formation area wherein a thin film transistor is formed and connected to the pixel electrode. The thin film transistor having a semiconductor layer serving as a channel, a terminal formed to be connected to the pixel electrode, a passivation layer formed to cover the thin film transistor and an organic insulating layer covering the passivation layer. The semiconductor layer is extended from a channel toward the pixel electrode formation area beyond the terminal and terminated in the pixel electrode formation area to form a termination end that is aligned with a termination end of the passivation layer. The organic insulating layer is elongated to cover the termination ends of the semiconductor layer and the passivation layer.

20 Claims, 17 Drawing Sheets

GATE LINES    DATA LINES

GATE LINES    DATA LINES

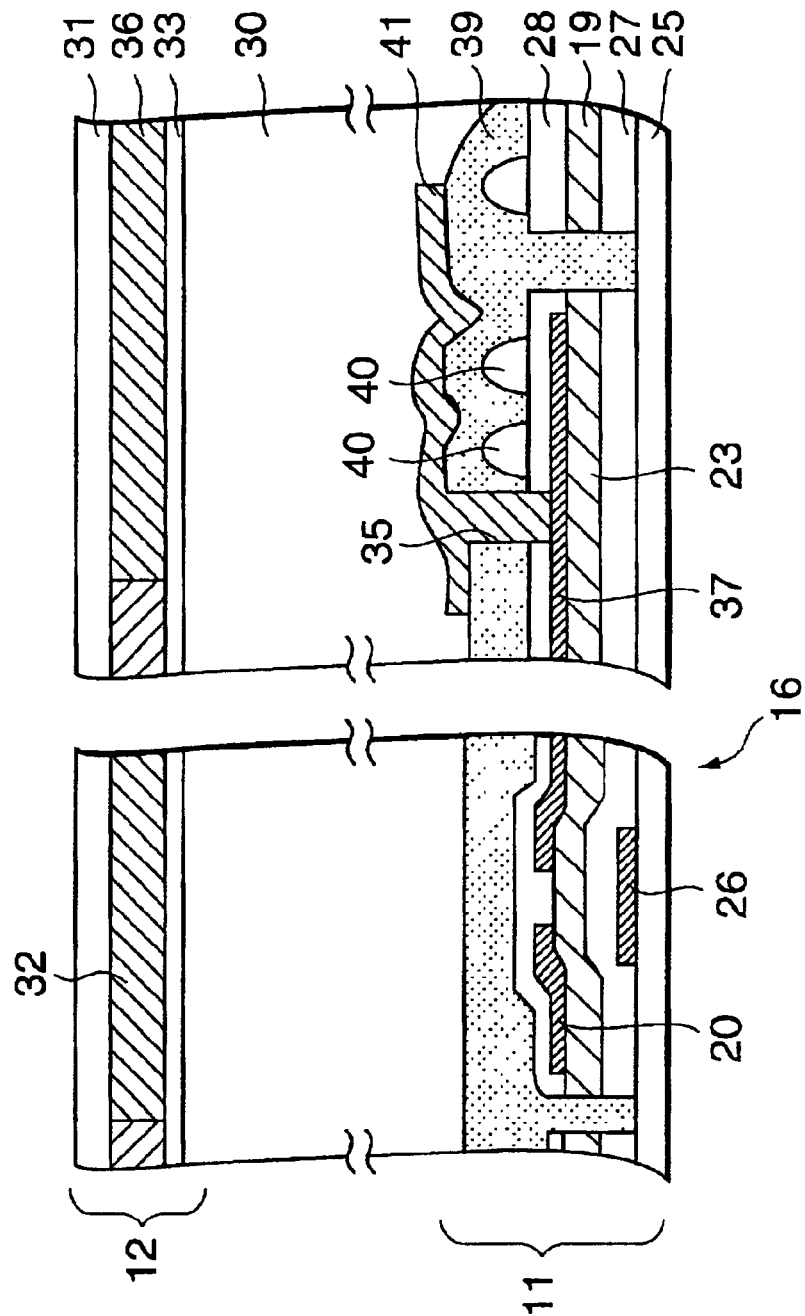

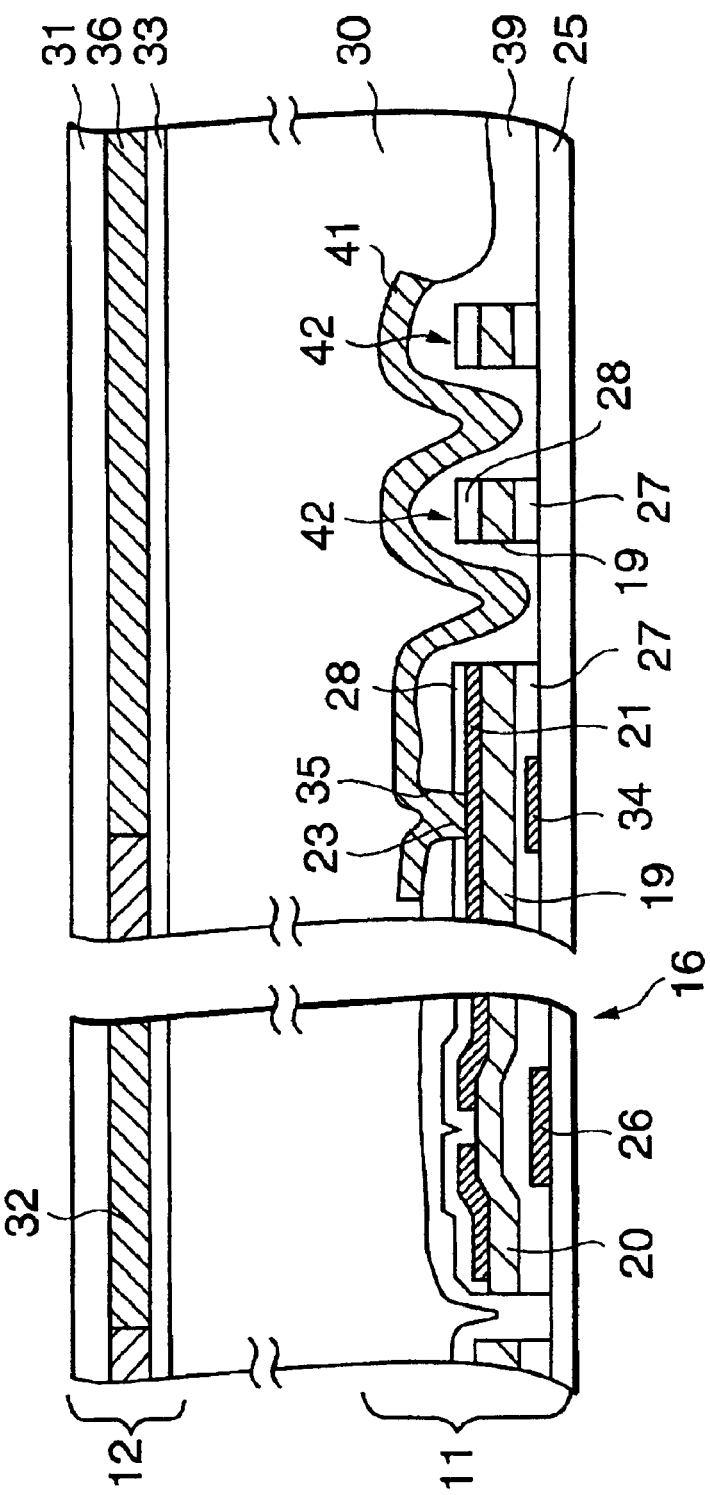

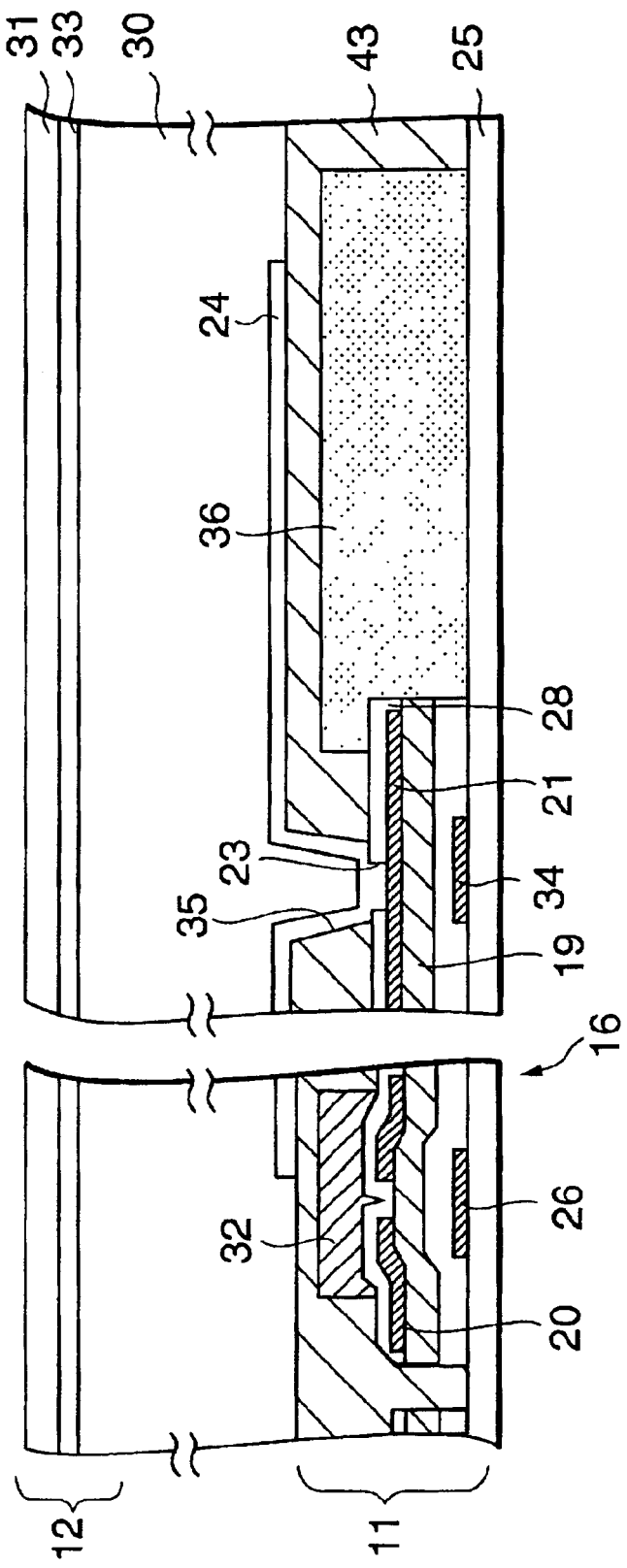

LIQUID CRYSTAL DISPLAY DEVICE

BACKGROUND OF THE INVENTION

1. Field of the Invention

This invention relates to a liquid crystal display device, and particularly to an active matrix type liquid crystal display device.

2. Description of Related Art

Conventionally an amorphous silicon thin film transistor (a-Si TFT) of channel etching type has been known as a switching element for an active matrix type liquid crystal display device.

FIG. 1 is a plan view of a conventional TFT array for liquid crystal display device. The drawing shows a portion of unit pixel. FIG. 2 is a sectional view of a TFT part of FIG. 1, and FIGS. 3A and 3B show terminal parts of FIG. 1 and FIG. 3A is a sectional view of a gate terminal electrode part and FIG. 3B is a sectional view of a data terminal electrode part.

As shown in FIG. 1, an a-Si TFT 1 is provided every pixel of an intersection of an XY matrix, and has a gate electrode 2, a source electrode 3 and a drain electrode 4 oppositely placed over the gate electrode 2. The gate electrode 2 is connected to a gate line 2a. The source electrode 3 is connected to a data line 3a. The drain electrode 4 is connected to a pixel electrode 6 via a contact through-hole 5.

As shown in FIG. 2, the gate electrode 2 formed on a transparent insulating substrate 7a is covered with a gate insulating film 7b and further a semiconductor layer 8 is formed in a position on the gate insulating film 7b superimposed on the gate electrode 2. The source electrode and the drain electrode 4 separated over the center of the semiconductor layer 8 are connected to the semiconductor layer 8 through an ohmic contact layer 9.

The ohmic contact layer 9 is etched and removed between the source electrode 3 and the drain electrode 4 is formed between the source electrode 3 and the semiconductor layer 8 and formed between the drain electrode 4 and the semiconductor layer 8. Further, a passivation film 7c is formed so as to cover the source electrode 3, the drain electrode 4, the ohmic contact layer 9 and the semiconductor layer 8. A transparent conductive film acting as the pixel electrode 6 is connected to the drain electrode 4 via the contact through-hole 5 through the passivation film 7c.

A switching signal is inputted to the gate electrode 2 of this a-Si TFT 1 through the gate line 2a and a video signal voltage is inputted to the source electrode 3 of this a-Si TFT 1 through the data line 3a, respectively and the video signal voltage is written to the pixel electrode 6.

As shown in FIG. 3A, in the gate terminal electrode part, a gate electrode pad 6a made of transparent conductive layer connected to the gate electrode 2 on the transparent insulating substrate 7a is exposed on the gate insulating film 7b and the passivation film 7c to form a gate terminal electrode 2b. As shown in FIG. 3B, in the data terminal electrode part, a drain electrode pad 6b made of transparent conductive layer connected to a data line on the gate insulating film 7b is exposed on the passivation film 7c to form a data terminal electrode 4a.

FIGS. 4A–4E are step diagrams showing a manufacturing method of the TFT array of FIG. 1 for the TFT part. As shown in FIG. 4A, first, a conductive layer made of aluminum (Al), molybdenum (Mo), chromium (Cr), etc. is deposited on a transparent insulating substrate 7a made of glass etc. with a thickness from about 100 to 400 nm by sputtering method.

Thereafter, first patterning for forming gate line (not shown), a gate electrode 2 and a gate terminal electrode (not shown) by a photolithography step is performed (see FIG. 4A). This gate terminal electrode (see FIG. 3A) is connected to an external signal processing substrate for display.

Next, as shown in FIG. 4B, a gate insulating film 7b made of a silicon nitride film etc., a semiconductor layer 8 made of amorphous silicon and an ohmic contact layer 9 made of $n^+$ amorphous silicon are successively stacked with thicknesses of the order of 400 nm, 300 nm, 50 nm, respectively, by plasma CVD. After the stacking, second photolithography step for patterning the semiconductor layer 8 and the ohmic contact layer 9 in a batch is performed.

Then, as shown in FIG. 4C a conductive layer made of Mo, Cr, etc. is deposited with a thickness from about 100 to 200 nm by sputtering method so as to cover the gate insulating film 7b and the ohmic contact layer 9. After the deposition, third photolithography step for forming a source electrode 3, a drain electrode 4 and a data line 3a is performed.

Along with this third photolithography step, the unnecessary ohmic contact layer 9 other than the lower portion of the source electrode 3 and the drain electrode 4 acting as a channel part of an a-Si TFT 1 is removed (see FIG. 4C).

Then, as shown in FIG. 4D, a passivation film 7c made of an inorganic insulating layer such as a silicon nitride film is formed with a thickness from about 100 to 200 nm by a plasma CVD so as to cover a back channel of the a-Si TFT 1, the source electrode 3, the data line 3a, the drain electrode 4 and the data terminal electrode (not shown).

After the film formation, fourth photolithography step for forming a contact through-hole 5 for making contact with the drain electrode 4 and a pixel electrode 6 and removing the unnecessary passivation film 7c on the data terminal electrode part (not shown) and the unnecessary gate insulating film 7b and passivation film 7c on the gate terminal electrode (not shown) is performed.

Further, as shown in FIG. 4E, a transparent conductive film acting as the pixel electrode 6 is formed by sputtering method and fifth photolithography step is performed.

In this manner, a TFT array is manufactured via the above-mentioned five photolithography steps (see FIGS. 4A to 4E). A liquid crystal display device is formed by sandwiching liquid crystal between two substrates in which this TFT array substrate is combined with another substrate for providing a color filter layer and a common electrode.

With respect to this conventional TFT array, development of a technique of improving performance of the liquid crystal display device by providing an organic insulating layer on the TFT array has been activated in recent years.

For example, a technique (organic interlayer separation technique) of controlling disclination of liquid crystal to improve display performance of the liquid crystal by providing a planarization layer made of an organic insulating layer on an active matrix substrate is disclosed in JP-A-6-242433.

Also, a technique (color filter on TFT technique) of improving an aperture ratio by providing a color filter layer on an active matrix substrate is disclosed in JP-A-8-122824.

Further, a method (unevenness reflection plate formation technique) of manufacturing a good reflective type liquid crystal display device with small reflection by forming unevenness by an organic insulating layer on an active matrix substrate and providing a reflection electrode thereon is disclosed in JP-A-5-232465.

A manufacturing method of a TFT array by an organic interlayer separation technique will be described below as one example. Incidentally, a technique using polycrystalline silicon TFT as a switching element is disclosed in JP-A-6-242433, but here, a technique using a channel etching type a-Si TFT as a switching element will be described for consistency with the conventional art.

In the case of this TFT array, a planarization layer made of a thick film is provided on a passivation film 7c and further a transparent conductive film acting as a pixel electrode 6 is provided on the planarization layer. This transparent conductive film is connected to a drain electrode 4 via a contact through-hole 5 through the planarization layer and the passivation film 7c.

Next, a manufacturing method of the TFT array by the organic interlayer separation technique will be described. A description to the fourth patterning (FIG. 4D) which is a formation step of a passivation film is omitted since the description is equal to that of the above-mentioned conventional art.

After the fourth patterning, the planarization layer is formed. Specifically, after a transparent photosensitive resist made of acrylic resin etc. is applied by a spin coat method, fifth patterning for opening the contact through-hole in the planarization layer by a photolithography step is performed.

Finally, as shown in FIG. 4E, the transparent conductive film acting as the pixel electrode 6 is formed by sputtering method and sixth photolithography step is performed.

However, in the manufacturing method of the TFT array by the organic interlayer separation technique, patterning steps increase by one step for forming the planarization layer. As a result of this, manufacturing steps become complicated to cause an increase in cost and a decrease in productivity cannot be avoided.

This is also similar to the color filter on TFT technique or the unevenness reflection plate formation technique, and by a step for forming a color filter layer or an overcoat layer, a step for forming an unevenness layer, respectively, the manufacturing steps become complicated and the productivity decreases.

SUMMARY OF THE INVENTION

An object of this invention is to provide a TFT array for liquid crystal display device capable of manufacturing a liquid crystal display device for providing an organic insulating layer on a transistor substrate to improve performance by smaller manufacturing steps in number and improving productivity.

In order to achieve the object, a liquid crystal display device comprises a plurality of pixels arranged in a matrix form, each of the pixels including a pixel electrode formation area wherein a pixel electrode is formed and a thin film transistor formation area wherein a thin film transistor is formed and connected to the pixel electrode. The thin film transistor having a semiconductor layer serving as a channel, a terminal formed to be connected to the pixel electrode, a passivation layer formed to cover the thin film transistor and an organic insulating layer covering the passivation layer. The semiconductor layer is extended from the channel toward the pixel electrode formation area beyond the terminal and terminated in the pixel electrode formation area to form a termination end that is aligned with a termination end of the passivation layer. And the organic layer is elongated to cover the termination ends of said semiconductor layer and the passivation layer. And the pixel electrode is connected to the terminal of the thin film transistor through a contact hole that is selectively formed in the organic insulating layer and the passivation layer.

As a result of this, a liquid crystal display device for providing an organic insulating layer on a transistor substrate to improve performance can be manufactured by smaller manufacturing steps in number and productivity can be improved.

BRIEF DESCRIPTION OF THE DRAWINGS

The above and other objects, advantages and features of the present invention will be more apparent from the following description taken in conjunction with the accompanying drawings, in which:

FIG. 3A is a sectional view of a gate terminal electrode part and FIG. 3B is a sectional view of a data terminal electrode part.

FIG. 7A is a sectional view taken along line A—A and FIG. 7B is a sectional view taken along line B—B and FIG. 7C is a sectional view taken along line C—C and FIG. 7D is a sectional view taken along line D—D;

FIG. 8A is a sectional view of the lead-out lines and FIG. 8B is a sectional view of the terminal parts;

FIGS. 11A and 11B show sectional structures of each portion of FIG. 10 and FIG. 11A is a sectional view taken along line A—A and FIG. 11B is a sectional view taken along line B—B;

FIGS. 14A and 14B show sectional structures of each portion of FIG. 13 and FIG. 14A is a sectional view taken along line A—A and FIG. 14B is a sectional view taken along line B—B;

FIGS. 17A and 17B show sectional structures of each portion of FIG. 16 and FIG. 17A is a sectional view taken along line A—A and FIG. 17B is a sectional view taken along line B—B.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Embodiments of this invention will be described below with reference to the drawings.

(First Embodiment)

Figure 1:
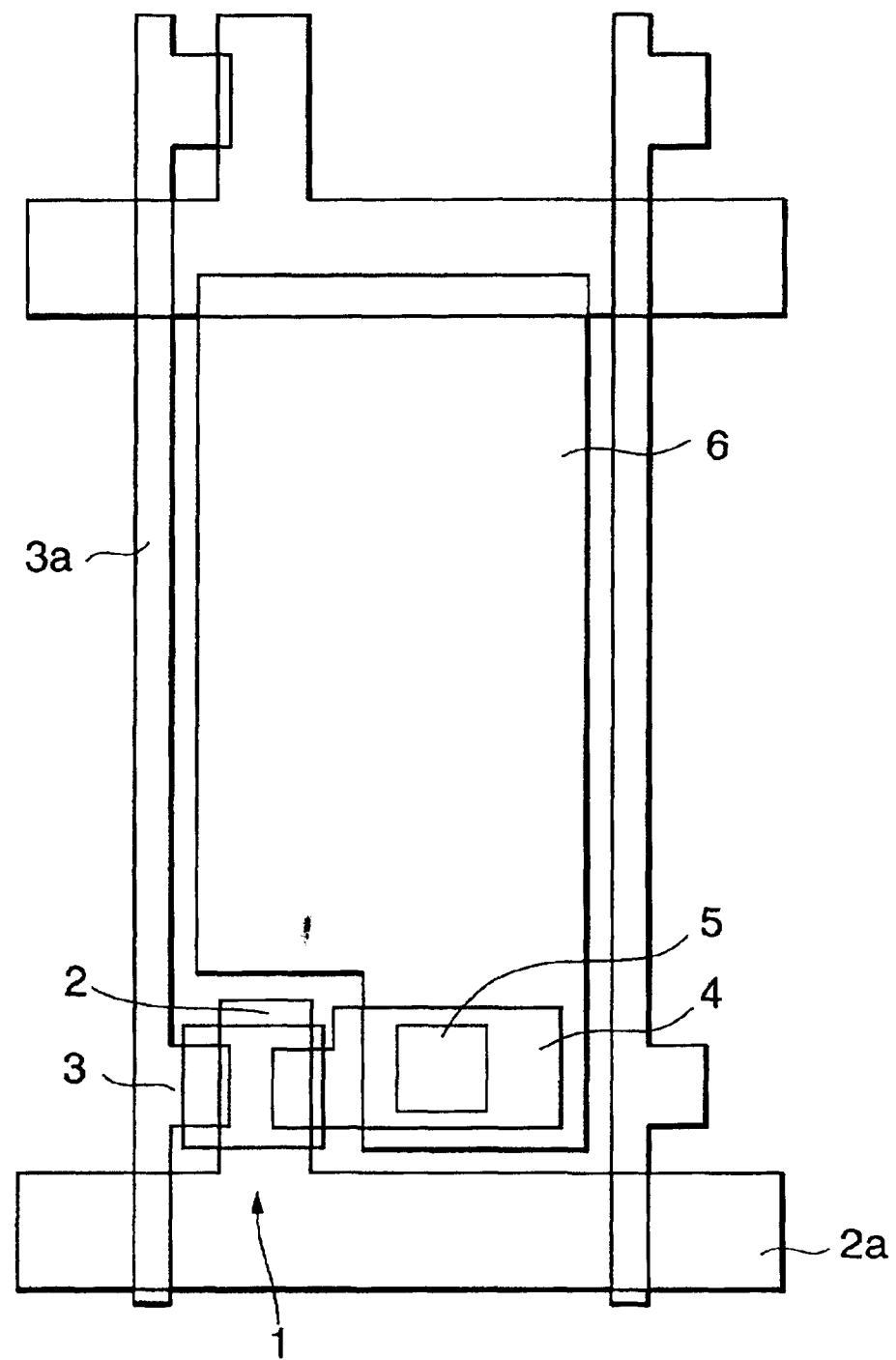
FIG. 1 is a plan view of a conventional active matrix type transistor substrate for liquid crystal display device.
Figure 2:
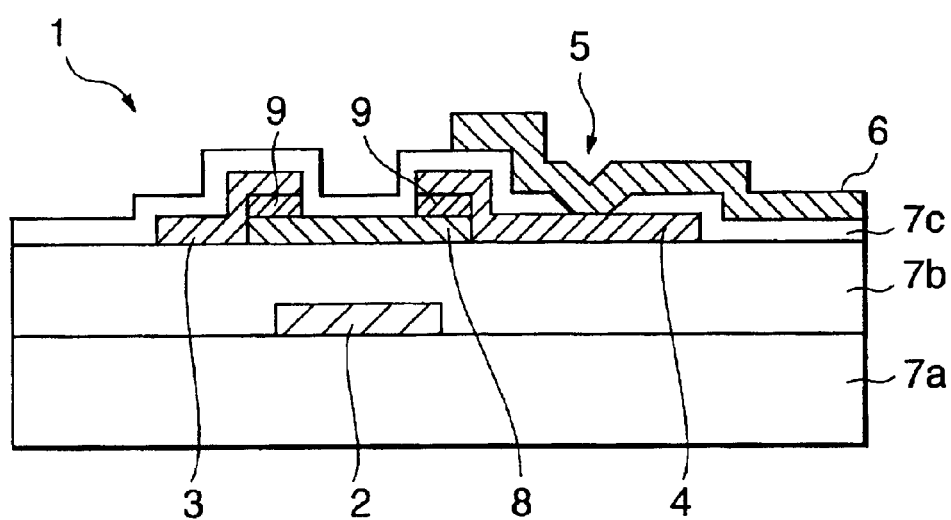
FIG. 2 is a sectional view of a thin film transistor part of FIG. 1.
Figure 3A:
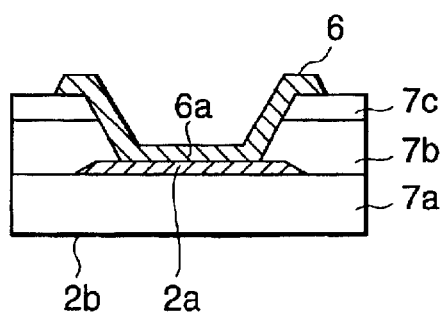
FIGS. 3A and 3B show terminal parts of FIG. 1
Figure 3B:
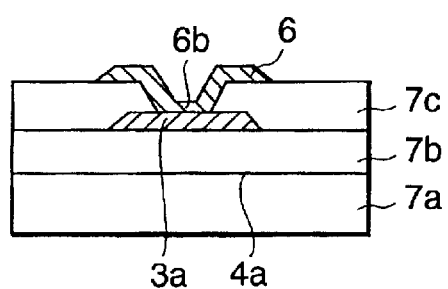
Figure 4A:
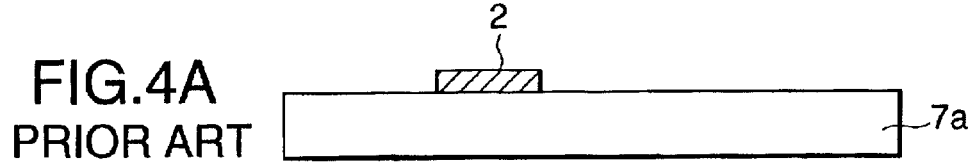
FIGS. 4A–4E are step diagrams showing a manufacturing method of the transistor substrate of FIG. 1 for the thin film transistor part.
Figure 4B:
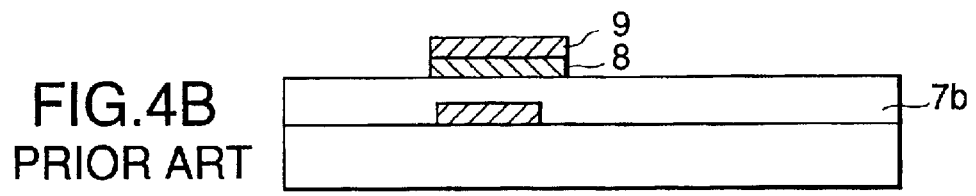
Figure 4C:
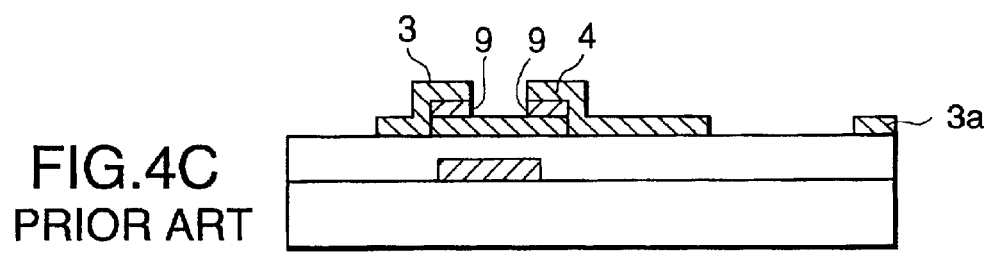
Figure 4D:
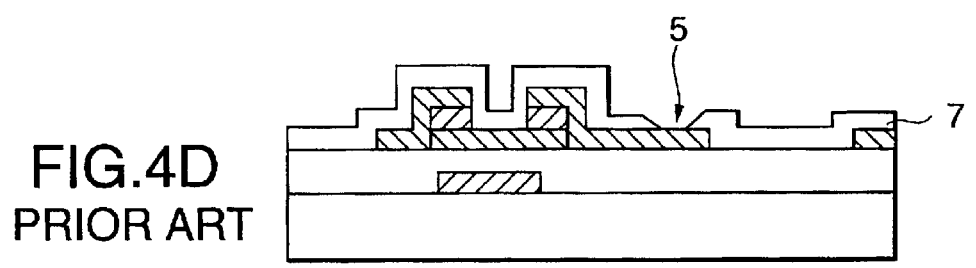
Figure 4E:
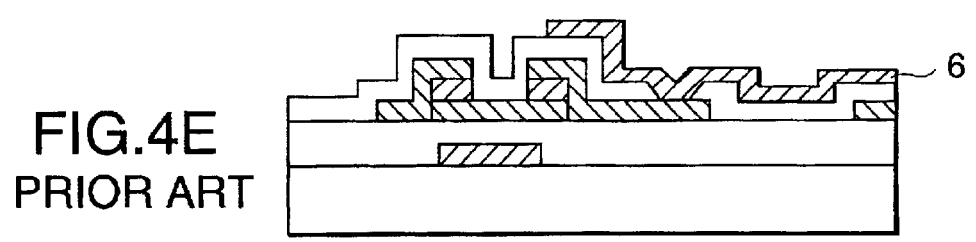
Figure 5:
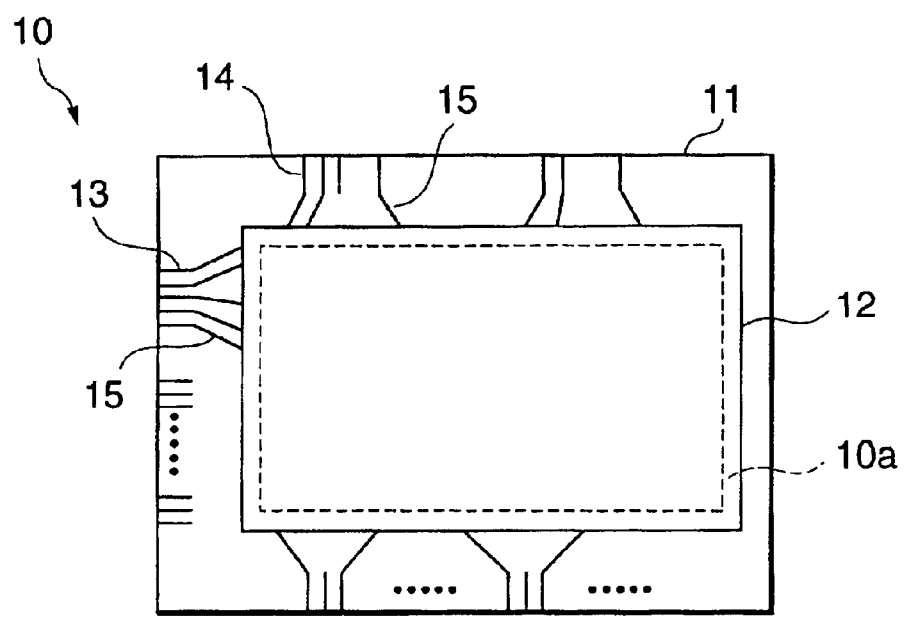
FIG. 5 is a schematic plan view of a display panel of a liquid crystal display device according to a first embodiment of this invention.

FIG. 5 is a schematic plan view of a display panel of a liquid crystal display device according to a first embodiment of this invention. This liquid crystal display device is an active matrix type liquid crystal display device in which an a-Si TFT acting as a switching element is provided on each one of intersections of an XY matrix.

As shown in FIG. 5, a display panel 10 is formed by filling a gap between a TFT substrate 11 and a transparent opposed substrate 12 with a liquid crystal. An a-Si TFT, a pixel electrode, a planarization layer and various lines, etc. are provided on the surface of the TFT substrate 11. A common electrode, a color filter layer and a light shield, etc. are provided on the surface of the opposed substrate 12.

A gate terminal electrode 13 or a data terminal electrode 14 is provided on the peripheral portion of the TFT substrate 11, and each of the terminals 13 and 14 is connected to an external signal processing circuit for display (not shown) through lead-out lines 15, respectively.

Then, by applying a data signal voltage between a pixel electrode of the TFT substrate 11 and a common electrode of the opposed substrate 12, an electro-optic state of the liquid crystal layer between both the electrodes is controlled to change an optical transmission state of the display panel 10 and a predetermined image is displayed on a display area 10a.

Figure 6:
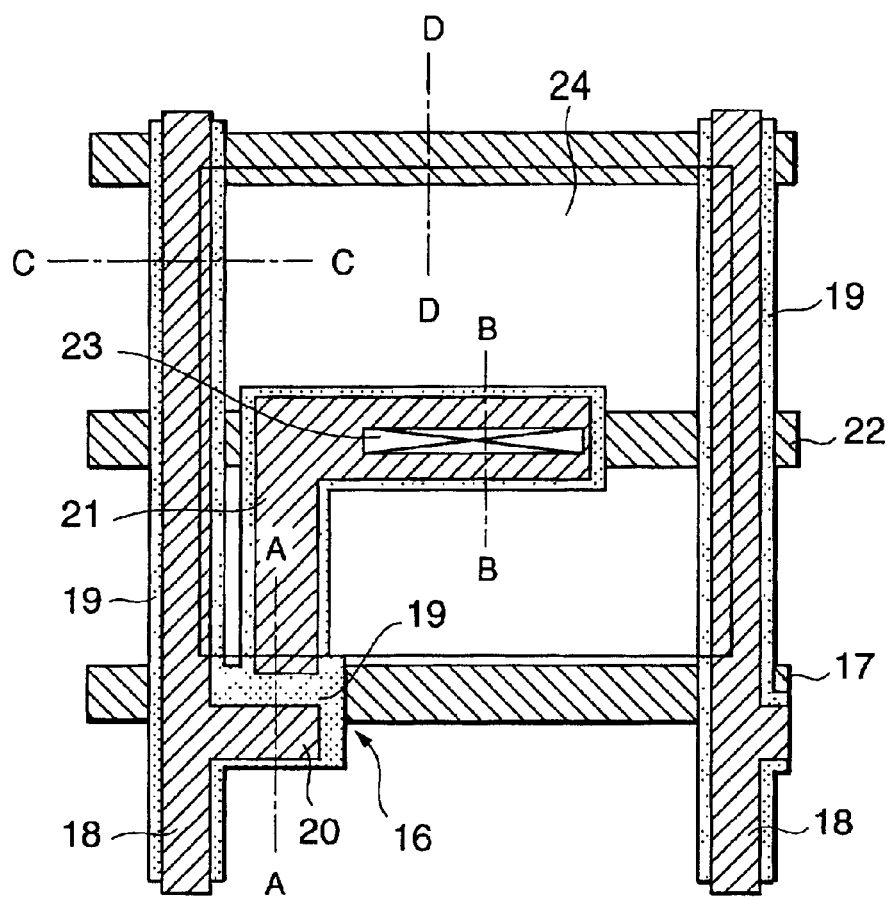
FIG. 6 is a plan view of a TFT array of FIG. 5.

FIG. 6 is a plan view of the TFT substrate of FIG. 5. The drawing shows a portion of a unit pixel. As shown in FIG. 6, an a-Si TFT 16 is provided on each one of intersections of gate lines 17 and data lines 18. The a-Si TFT 16 has a gate electrode (not shown), a drain electrode and a source electrode 20 oppositely placed over the gate electrode on a semiconductor layer 19. As shown in FIG. 6, this liquid crystal display device has a plurality of pixels arranged in a matrix form and each of the pixels including a pixel electrode formation area wherein a pixel electrode is formed. And the liquid crystal display device has a thin film transistor formation area wherein a thin film transistor is formed and connected to the pixel electrode. The thin film transistor has a semiconductor layer serving as a channel, a terminal formed to be connected to the pixel electrode. The drain electrode 21 is formed in L shape so that substantially half of the drain electrode overlaps with a storage line 22 provided in parallel with the gate line 17. This drain electrode 21 is connected to a pixel electrode 24 via a contact through-hole 23 and the gate electrode is connected to the gate line 17 and the source electrode 20 is connected to the data line 18, respectively.

A switching signal is inputted to the gate electrode of the a-Si TFT 16 through the gate line 17 and a video signal voltage is inputted to the the source electrode 20 of the a-Si TFT 16 through the data line 18, respectively and the video signal voltage is written to the pixel electrode 24.

Figure 7A:
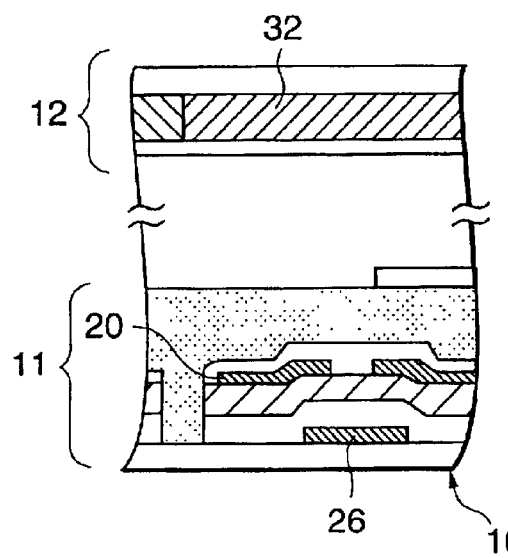
FIGS. 7A–7D show a sectional structure of each portion of FIG. 6
Figure 7B:
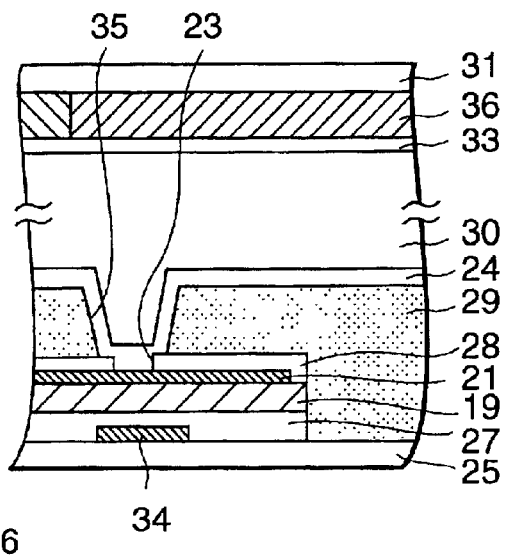
Figure 7C:
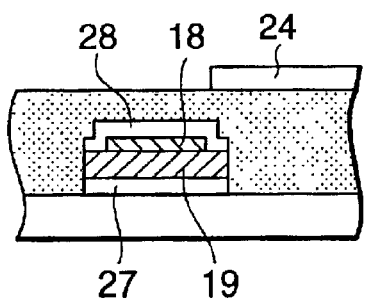
Figure 7D:
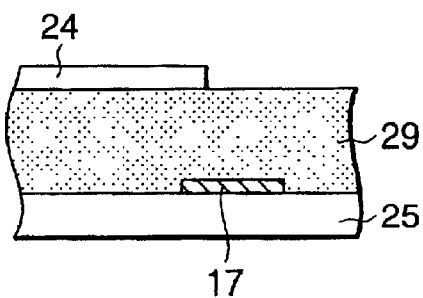

FIG. 7 shows a sectional structure of each portion of FIG. 6, and FIG. 7A is a sectional view taken along line A—A, and FIG. 7B is a sectional view taken along line B—B, and FIG. 7C is a sectional view taken along line C—C, and FIG. 7D is a sectional view taken along line D—D.

As shown in FIG. 7A, a gate electrode 26 of the a-Si TFT 16 is formed on a transparent insulating substrate 25 and a gate insulating film 27 is formed so as to cover this gate electrode 26 and further the semiconductor layer 19 is formed on the gate insulating film 27.

The source electrode 20 and the drain electrode 21 separated by a back channel of the a-Si TFT 16 provided over the center of the semiconductor layer 19 are formed on the semiconductor layer 19. The source electrode 20 and the drain electrode 21 are connected to the semiconductor layer 19 through an ohmic contact layer (not shown). The ohmic contact layer is formed between the source electrode 20 and the semiconductor layer 19 and formed between the drain electrode 21 and the semiconductor layer 19.

The source electrode 20, the drain electrode 21 and semiconductor layer 19 are covered with a passivation film 28, and a thick organic insulating layer 29 is formed on this passivation film 28. A transparent conductive film acting as the pixel electrode 24 located over the drain electrode 21 is formed on the organic insulating layer 29. As shown in FIG. 7A, the passivation layer is formed to cover the thin film transistor and an organic insulating layer is formed to cover the passivation layer.

The pixel electrode 24 is further formed on the TFT substrate 11. A light shield 32 and a common electrode 33 are formed on the opposed substrate 12. A liquid crystal layer 30 is sandwiched between the TFT substrate 11 and the opposed substrate 12.

As shown in FIG. 7B, the semiconductor layer 19, the drain electrode 21 and the passivation film 28 of the a-Si TFT 16 are extended over a storage capacity electrode 34. The storage capacity electrode 34 is formed on the transparent insulating substrate 25 and is covered with the gate insulating film 27.

Contact through-holes 23, 35 through the passivation film 28 and the organic insulating layer 29 are opened. The pixel electrode 24 and the drain electrode 21 are connected via the contact through-holes 23, 35.

Also, the light shield 32 of the opposed substrate 12 abuts on a color filter layer 36 of the opposed substrate 12. The color filter layer 36 and the common electrode 33 are stacked under the transparent insulating substrate 31.

That is, the semiconductor layer 19 and the passivation film 28 are positioned outside the source electrode 20 and the drain electrode 21 so as to inwardly surround the source electrode 20 and the drain electrode 21. Also, a stacked structure by the passivation film 28, the semiconductor layer 19 and the gate insulating film 27 is formed in upward taper shape.

A switching signal is inputted to the gate electrode of the a-Si TFT 16 through the gate line 17 and a video signal voltage is inputted to the source electrode 20 of the a-Si TFT 16 through the data line 18, respectively and the video signal voltage is written to the pixel electrode 24.

As shown in FIG. 7C, the data line 18 is formed by sequentially stacking the gate insulating film 27, the semiconductor layer 19, the data line 18 and the passivation film 28 on the transparent insulating substrate 25, and further is covered with the organic insulating layer 29. As shown in FIG. 7D, the gate line 17 is formed on the transparent insulating substrate 25 and is covered with the organic insulating layer 29.

Figure 8A:
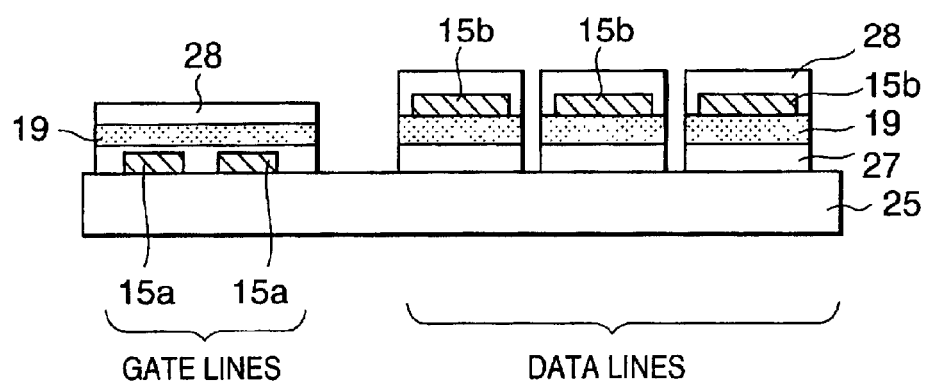
FIGS. 8A and 8B show each sectional structure of lead-out lines and terminal parts of FIG. 5
Figure 8B:
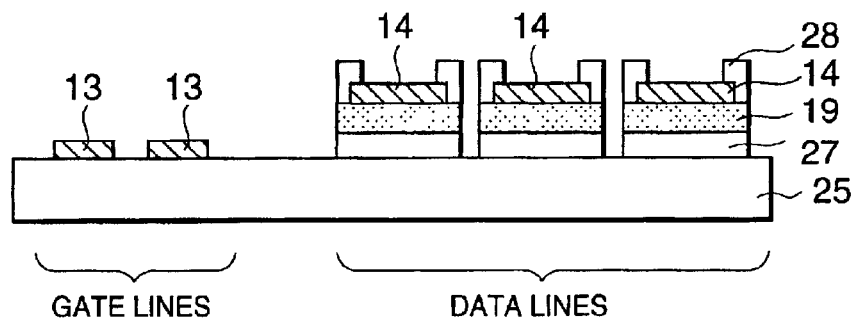

FIGS. 8A and 8B show sectional structures of lead-out lines and terminal parts of FIG. 5, and FIG. 8A is a sectional view of the lead-out line, and FIG. 8B is a sectional view of the terminal part. As shown in FIG. 8A, lead-out line 15a is formed by sequentially stacking lead-out line 15a of the gate side, the gate insulating film 27, the semiconductor layer 19 and the passivation film 28 on the transparent insulating substrate 25. A lead-out line 15b is formed by sequentially stacking the gate insulating film 27, the semiconductor layer 19, lead-out line 15b of the data side and the passivation film 28 on the transparent insulating substrate 25.

As shown in FIG. 8B, in the terminal part, a gate terminal electrode 13 is formed on the transparent insulating substrate 25. A data terminal electrode 14 is formed by sequentially stacking the gate insulating film 27, the semiconductor layer 19, a data terminal electrode 14 and the passivation film 28 exposing a part of the data terminal electrode 14 on the transparent insulating substrate 25.

Figure 9A:
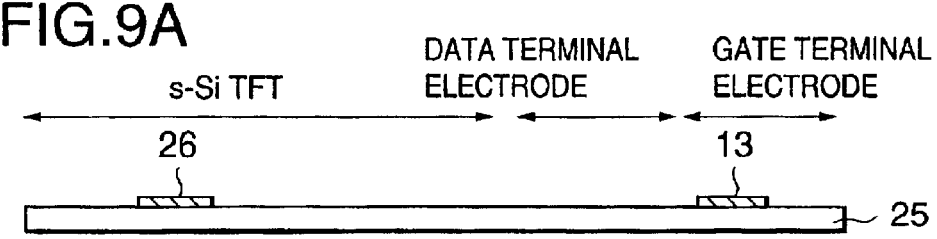
FIGS. 9A–9E are step diagrams showing a manufacturing method of the transistor substrate of FIG. 5 for a thin film transistor part.

FIGS. 9A–9E are step diagrams showing a manufacturing method of the transistor substrate of FIG. 5 for a thin film transistor part. As shown in FIG. 9A, first, a conductive layer made of, for example, aluminum (Al), molybdenum (Mo), chromium (Cr), etc. is deposited on a transparent insulating substrate 25 made of glass etc. with a thickness from about 100 to 400 nm by a sputtering device.

Thereafter, first patterning for forming gate line (not shown), a gate electrode 26 and a gate terminal electrode 13 by a photolithography step is performed.

Figure 9B:
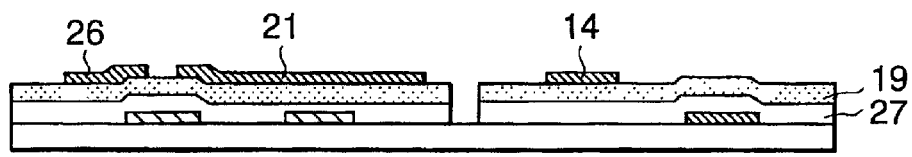

Next, as shown in FIG. 9B, a gate insulating film 27 made of a silicon nitride film etc., a semiconductor layer 19 made of amorphous silicon and an ohmic contact layer (not shown) made of n+ amorphous silicon are successively stacked with thicknesses of the order of about 400 nm, about 300 nm, about 50 nm, respectively, by plasma CVD. After the stacking, so as to cover these, a conductive layer made of Mo, Cr, etc. is further deposited with a thickness from about 100 to 200 nm by a sputtering method.

After the deposition, second patterning for forming a source electrode 20, data line 18, a drain electrode 21 and a data terminal electrode part (see FIG. 8B) by the photolithography step is performed.

Along with this second patterning, the unnecessary ohmic contact layer other than the lower portion of the source electrode 20 and the drain electrode 21 is removed.

Then, a passivation film 28 made of an inorganic insulating layer such as a silicon nitride film is formed with a thickness from about 100 to 200 nm by plasma CVD so as to cover a back channel of the a-Si TFT 16, the source electrode 20, the data line (data line) 18, the drain electrode 21 and a data terminal electrode 14.

After the film formation, a contact through-hole 23 for making contact with the drain electrode 21 and a pixel electrode 24 is formed, and the unnecessary passivation film 28 on the data terminal electrode part 14 and the unnecessary gate insulating film 27 and passivation film 28 on the gate terminal electrode 13 are removed.

Thereafter, using the same mask without peeling a resist, a surface of the semiconductor layer 19 is removed.

Figure 9C:
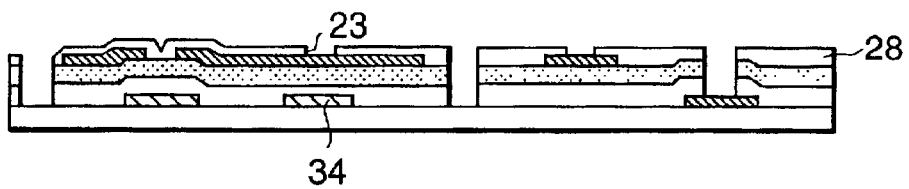

As shown in FIG. 9C, third patterning for performing patterning of the passivation film 28 and patterning of the semiconductor layer 19 in the same step thus is performed.

Here, in etching of the passivation film 28 and the semiconductor layer 19, for example, using buffered hydrofluoric acid (BHF), an over-etching tendency of the passivation film 28 is performed by wet etching and retreat is made from the resist and then the semiconductor layer 19 and a layer of the gate insulating film 27 are etched by reactive dry etching. As a result of this, a good taper shape can be obtained.

Also, the passivation film 28, the semiconductor layer 19 and the gate insulating film 27 may be etched in a batch by adjusting an etching condition to perform dry etching.

Figure 9D:
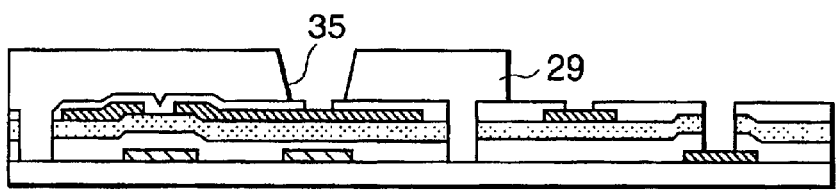

Then, as shown in FIG. 9D, an overcoat layer is formed. Specifically, fourth patterning for opening a contact through-hole 35 in an organic insulating layer 29 by a photolithography step after a transparent photosensitive resist made of acrylic resin etc. is applied by a spin coat method is performed.

Figure 9E:
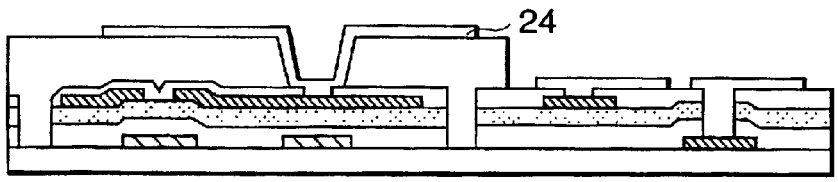

Finally, as shown in FIG. 9E, a transparent conductive film acting as the pixel electrode 24 is formed on the organic insulating layer 29 by the sputtering device and fifth patterning is performed.

In this case, the lead-out line 15a of the gate side and the gate terminal electrode 13 are formed in the first patterning step, and gate insulating film 27 covering the lead-out line 15a of the gate side, the semiconductor layer 19, the lead-out line 15b of the data side and the data terminal electrode 14 are formed the in the second patterning step, and the passivation film 28 covering the semiconductor layer 19, the lead-out line 15b of the data side and the data terminal electrode 14 with a part of the data terminal electrode 14 exposed is formed in the third patterning step.

As described above, in the first embodiment, by performing the formation of the passivation film 28 and the formation of the semiconductor layer 19 in the same patterning step, patterning steps can be reduced by one step as compared with a conventional manufacturing method of an active matrix substrate of an organic interlayer separation type. The semiconductor is extended from channel toward the pixel electrode formation area beyond the terminal and terminated in the pixel electrode formation area to form a termination end that is aligned with a termination end of the passivation layer. And the organic layer being elongated to cover the termination ends of the semiconductor layer and the passivation layer. And the pixel electrode is connected to the terminal of the thin film transistor through a contact hole that is selectively formed in said organic insulating layer and said passivation layer.

As a result of this, the manufacturing steps can be simplified and an active matrix type liquid crystal display device with low cost, high throughput and good display performance can be manufactured.

Also, as described above, by forming the organic insulating layer 29 by batch dry etching, the gate line 17 can be protected directly while covering the data line 18 or bumps of the a-Si TFT 16. Also, there are no fears of a side leak etc. since the side of the semiconductor layer 19 can be protected by providing the organic insulating layer 29.

Further, even in case that the passivation film 28, the semiconductor layer 19 and the gate insulating film 27 do not become a good etching shape by batch dry etching, the organic insulating layer 29 flattens them, so that few manufacturing defects occur even if the etching shape deteriorates.

In this first embodiment, the photosensitive acrylic film is used as the overcoat film, but using non-photosensitive acrylic, patterning may be performed by etching.

Also, in order to suppress the side leak of the semiconductor layer 19, Si series organic insulating layers such as photosensitive or non-photosensitive polysilazane, siloxane, benzocyclobutene (BCB) may be used.

(Second Embodiment)

Figure 10:
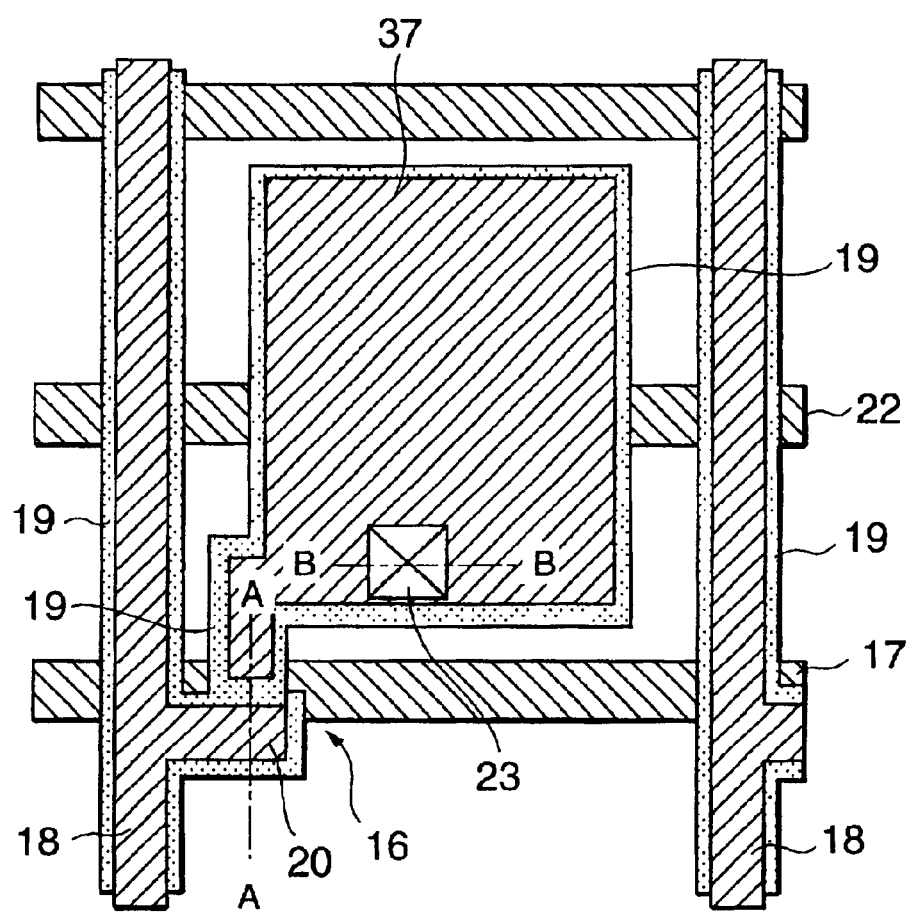
FIG. 10 is a plan view of a TFT array of a liquid crystal display device according to a second embodiment of this invention.

FIG. 10 is a plan view of a TFT substrate of a liquid crystal display device according to a second embodiment of this invention. The drawing shows a portion of unit pixel. This liquid crystal display device is a reflective type active matrix liquid crystal display device.

As shown in FIG. 10, an a-Si TFT 16 acting as an switching element has a drain electrode 37 formed in substantially rectangular shape in the pixel electrode formation area. This drain electrode 37 is connected to a reflection electrode 41 described below via contact through-holes 23, 35. Also, a semiconductor layer 19 is formed in correspondence with the drain electrode 37. The other configuration and action are similar to those of the TFT substrate shown in FIG. 6.

FIGS. 11A and 11B show sectional structures of each portion of FIG. 10, and FIG. 11A is a sectional view taken along line A—A, and FIG. 11B is a sectional view taken along line B—B. As shown in FIG. 11A, a gate electrode 26 of the a-Si TFT 16 is formed on a transparent insulating substrate and a gate insulating film 27 is formed so as to cover this gate electrode 26 and further the semiconductor layer 19 is formed on the gate insulating film 27.

A source electrode 20 and the drain electrode 37 separated by a back channel of the a-Si TFT 16 provided over the center of the semiconductor layer 19 are formed on the semiconductor layer 19 (see FIG. 11A). The source electrode 20 and the drain electrode 37 are connected to the semiconductor layer 19 through an ohmic contact layer (not shown). The ohmic contact layer is formed between the source electrode 20 and the semiconductor layer 19 and formed between the drain electrode 37 and the semiconductor layer 19.

These source electrode 20, drain electrode 37 and semiconductor layer 19 are covered with a passivation film 28, and an unevenness layer 39 made of a thick film is formed so as to cover this passivation film 28. This unevenness layer 39 is formed using plural base posts 40 protrusively provided on the passivation film 28 as a base (see FIG. 11B).

Further, the reflection electrode 41 is formed on the unevenness layer 39, and this reflection electrode 41 is connected to the drain electrode 37 via a contact through-hole passing through the unevenness layer 39 and a contact through-hole 23 passing through the passivation film 28 (see FIG. 11B).

A switching signal is inputted to the gate electrode of the a-Si TFT 16 through the gate line 17 and a video signal voltage is inputted to source electrode 20 of the a-Si TFT 16 through the data line 18, respectively and the video signal voltage is written to the reflection electrode 41.

FIGS. 12A–12E are step diagrams showing a manufacturing method of the transistor substrate of FIG. 10 for a thin film transistor part. Here, a description to the steps for forming the passivation film 28 (see FIGS. 8A–8E) are omitted since the description is similar to that of the first embodiment.

After forming the passivation film 28 by third patterning, the base posts 40 are formed on the passivation film 28 and the unevenness layer 39 is formed. The unevenness layer 39 is formed by applying, exposing, developing and calcining a transparent photosensitive resist made of acrylic resin etc. acting as a base by a spin coat method.

After forming the photosensitive resist, a photosensitive overcoat film made of a film thinner than the unevenness layer 39 of the base is applied and the contact through-hole 35 is opened by a photolithography step.

Figure 12A:
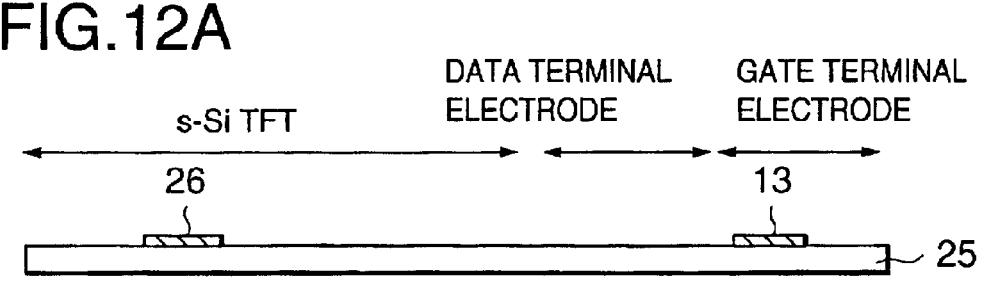
FIGS. 12A–12E are step diagrams showing a manufacturing method of the transistor substrate of FIG. 10 for a thin film transistor part.
Figure 12B:
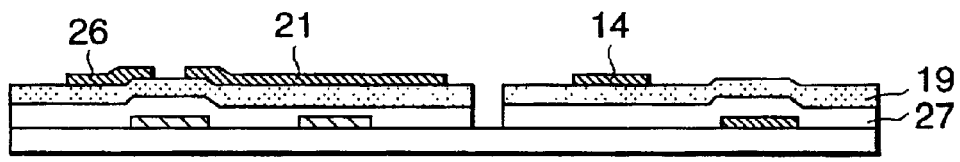
Figure 12C:
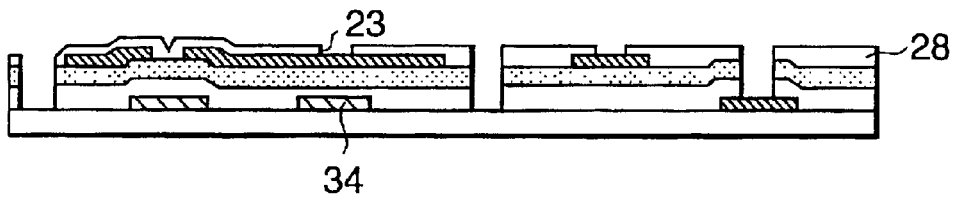
Figure 12D:
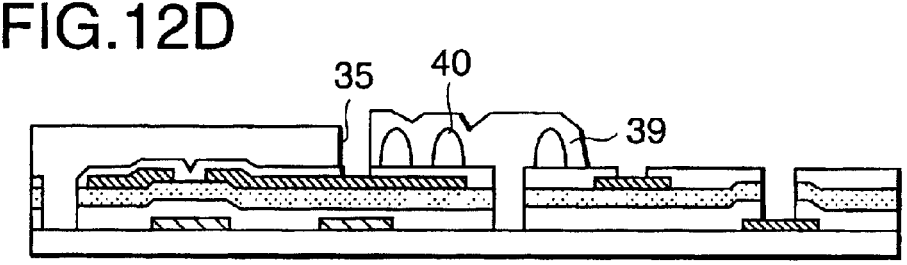

Fourth patterning for forming the unevenness layer 39 via such a two-layer process is performed (see FIG. 12D).

Also, the fourth patterning for forming the unevenness layer 39 may be performed by a one-layer process for forming the unevenness layer 39 and the contact through-hole 35 by changing the photosensitive amount of the unevenness layer 39 and the exposure amount of the contact through-hole 35 using a gray tone mask and so on.

Figure 12E:
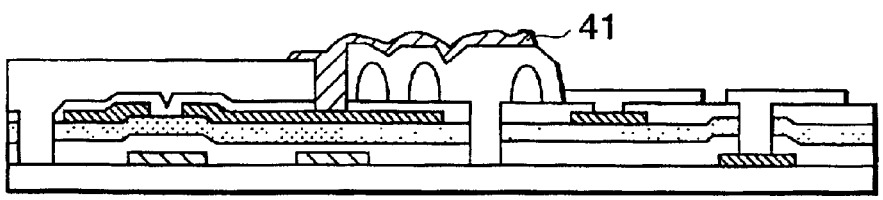

Finally, fifth patterning for forming the reflection film acting as the reflection electrode 41 on the unevenness layer 39 by a sputtering device with aluminum (Al) or silver (Ag) is performed (see FIG. 12E).

(Third Embodiment)

Figure 13:
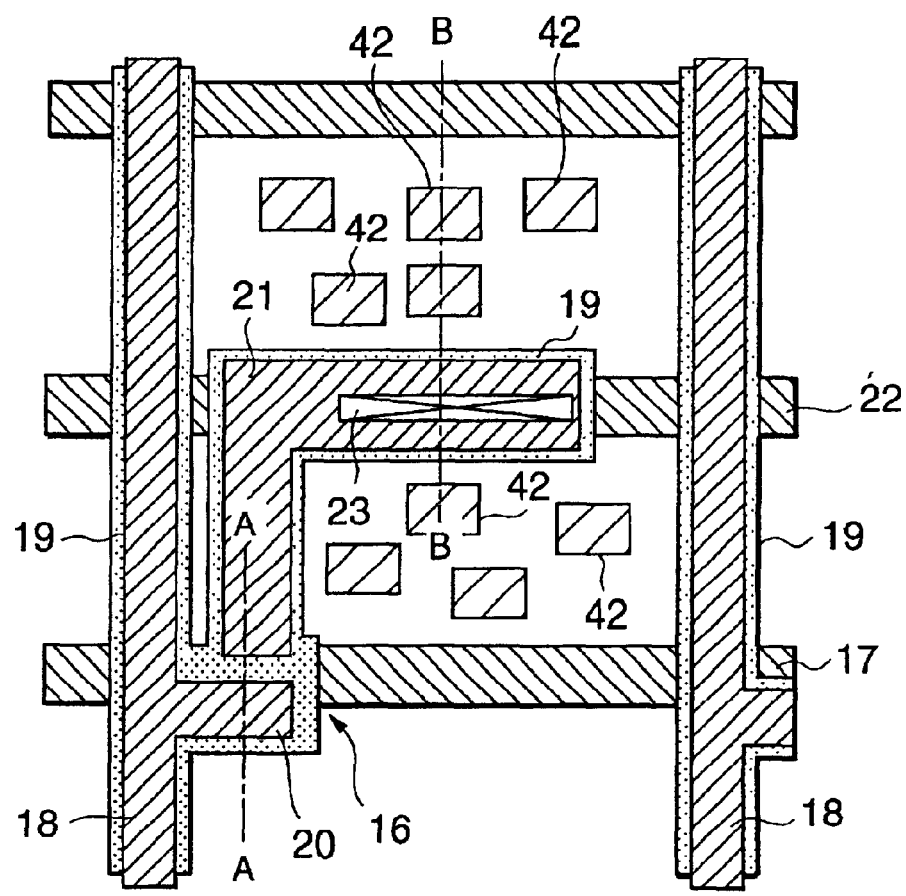
FIG. 13 is a plan view of a TFT array of a liquid crystal display device according to a third embodiment of this invention.
Figure 15A:
FIGS. 15A–15E are step diagrams showing a manufacturing method of the transistor substrate of FIG. 13 for a thin film transistor part.
Figure 15B:
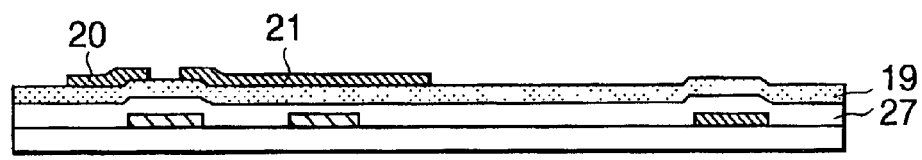
Figure 15C:
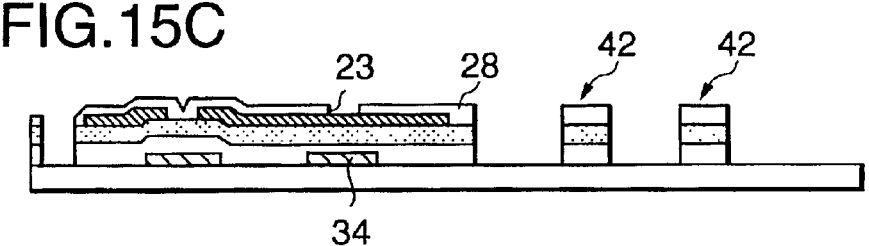
Figure 15D:
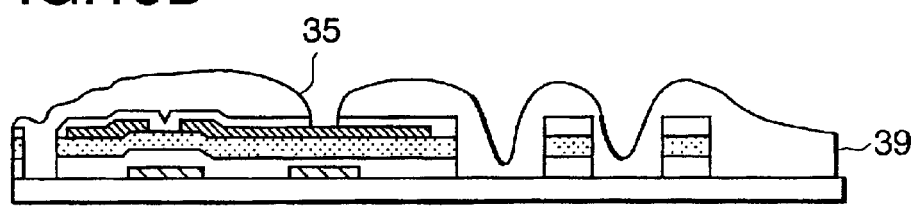
Figure 15E:
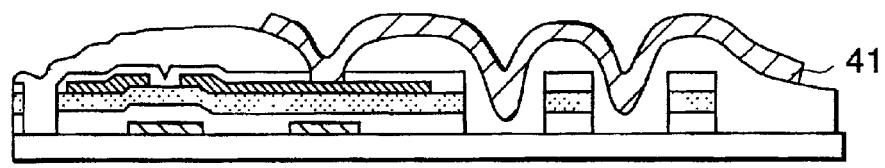

FIG. 13 is a plan view of a TFT substrate of a liquid crystal display device according to a third embodiment of this invention. The drawing shows a portion of unit pixel. This liquid crystal display device is a reflective active matrix type liquid crystal display device.

As shown in FIG. 13, an a-Si TFT 16 acting as an switching element has a drain electrode 21 formed in L shape so that substantially half of the drain electrode overlaps with storage line 22 provided in parallel with gate line 17. Also, plural prism-shaped base posts 42 acting as bases of an unevenness layer 39 are provided. The other configuration and action are similar to those of the TFT substrate shown in FIG. 10.

FIGS. 14A and 14B show sectional structures of each portion of FIG. 13, and FIG. 14A is a sectional view taken along line A—A, and FIG. 14B is a sectional view taken along line B—B. As shown in FIG. 14A, contact through-holes 23, 35 are provided on a storage capacity electrode 34.

The prism-shaped base posts 42 formed by stacking a gate insulating film 27, a semiconductor layer 19 and a passivation film 28 are protrusively provided on a transparent insulating substrate 25 instead of the base posts 40 protrusively provided on the passivation film 28 (see FIG. 14B).

An overcoat layer is provided on this base post 42 and the unevenness layer 39 is formed using the base posts 42 as a base while covering bumps of the a-Si TFT 16 etc. (see FIGS. 14A and 14B). Further, a reflection electrode 41 is formed on the unevenness layer 39, and this reflection electrode 41 is connected to the drain electrode 21 via a contact through-hole 35 passing through the unevenness layer 39 and a contact through-hole 23 passing through the passivation film 28 (see FIG. 14B). The other configuration is similar to the sectional structure of each the portion shown in FIG. 11.

FIGS. 15A–15E are step diagrams showing a manufacturing method of the transistor substrate of FIG. 13 for a thin film transistor part.

Here, except that the base post 42 having a stacked structure made of the gate insulating film 27, the semiconductor layer 19 and the passivation film 28 is formed at the time of formation of the a-Si TFT 16 in third patterning (see FIG. 15C) and the unevenness layer 39 using this base post 42 as a base is formed in fourth patterning (see FIG. 15D), manufacturing steps are similar to the manufacturing steps shown in FIG. 12, so that description of the manufacturing steps is omitted.

In the case of the manufacturing method shown in this third embodiment, the number of processes can be reduced further than the case of the manufacturing method shown in the second embodiment.

(Fourth Embodiment)

Figure 16:
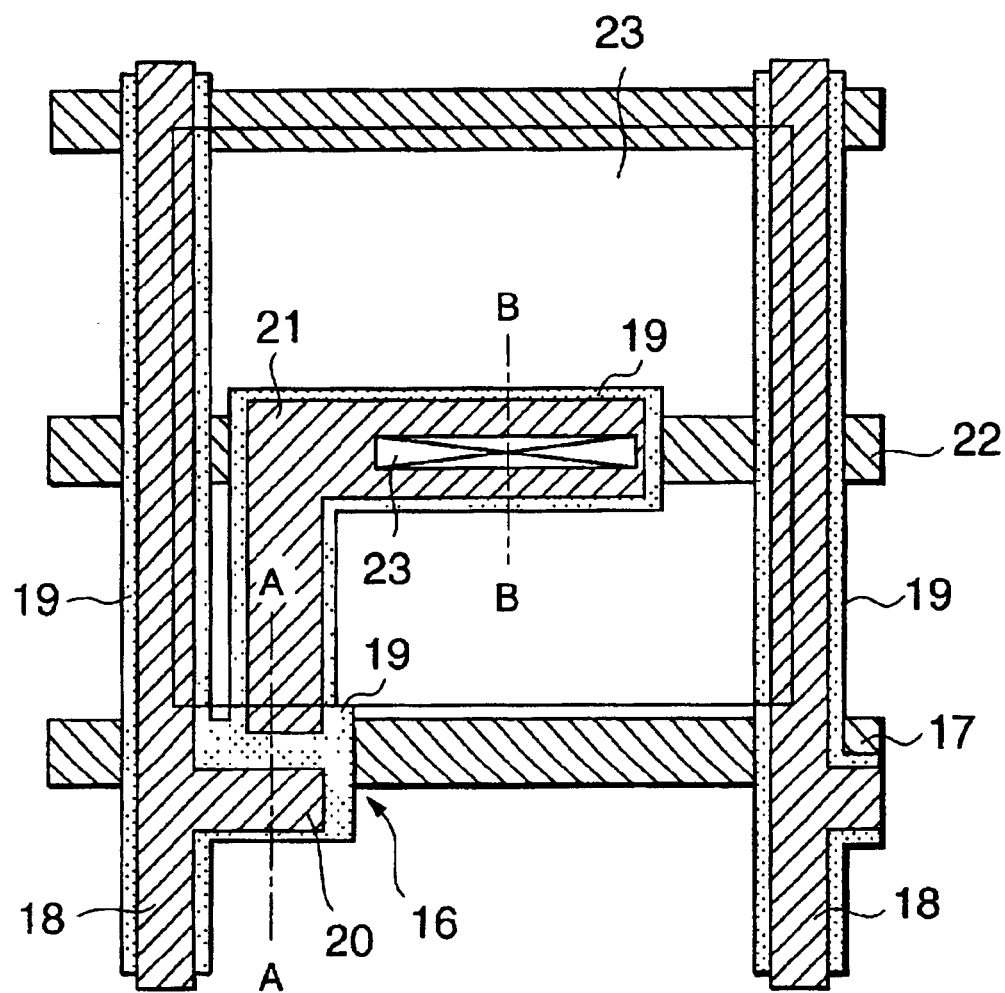
FIG. 16 is a plan view of a TFT array of a liquid crystal display device according to a fourth embodiment of this invention.

FIG. 16 is a plan view of a TFT substrate of a liquid crystal display device according to a fourth embodiment of this invention. The drawing shows a portion of unit pixel. This liquid crystal display device is an active matrix type liquid crystal display device of color filter on TFT (COT) type.

As shown in FIG. 16, an a-Si TFT 16 acting as an switching element has a drain electrode 21 formed in L shape so that substantially half of the drain electrode overlaps with storage line 22 provided in parallel with gate line 17, and is similar to the TFT substrate shown in FIG. 6.

FIGS. 17A and 17B show sectional structures of each portion of FIG. 16, and FIG. 17A is a sectional view taken along line A—A, and FIG. 17B is a sectional view taken along line B—B. As shown in FIG. 17A, a TFT substrate 11 and an opposed substrate 12 are made of a pair of oppositely placed transparent glass substrates, and a gap between both the substrates 11, 12 is filled with a liquid crystal layer 30.

The a-Si TFT 16, a pixel electrode 24, a light shield 32, a color filter layer 36, an overcoat layer (a planarization layer) 43 and various line (not shown), etc. are provided on the surface of the transparent glass substrate (transparent insulating substrate 25) of the TFT substrate 11. A common electrode 33 is provided on the opposed surface side of the transparent glass substrate (transparent insulating substrate 31) of the opposed substrate 12.

That is, the light shield 32 and the color filter layer 36 are formed in the TFT substrate 11 rather than the opposed substrate 12. The other configuration and action are similar to those of the first embodiment shown in FIG. 7.

The light shield 32 and a part of the color filter layer 36 are formed on a passivation film 28 and further, the overcoat layer 43 for protecting the light shield 32 and the color filter layer 36 is formed. A transparent conductive film acting as the pixel electrode 24 is formed on this overcoat layer 43, and the pixel electrode 24 is connected to the drain electrode 21 via a contact through-hole passing through the overcoat layer 43 and a contact through-hole 23 passing through the passivation film 28.

By applying an image signal voltage between this pixel electrode 24 and the common electrode 33 and controlling an electro-optic state of the liquid crystal layer 30 between both the electrodes 24 and 33, an optical transmission state of a display panel 10 is changed and a predetermined image is displayed on a display area 10a.

Except that the light shield 32 or the color filter layer 36 is patterned and formed on the TFT substrate 11 by a normal photolithography step, a manufacturing method of an active matrix substrate according to the fourth embodiment is similar to that of the first embodiment, so that the description is omitted.

As described above, in a manufacturing method of an active matrix type liquid crystal display device according to this invention, patterning of a semiconductor layer 19 and patterning of the passivation film 28 after forming a source electrode 20 are performed simultaneously, so that it is formed into a configuration in which the semiconductor layer 19 is positioned under data line 18, the source electrode 20 and the drain electrode 21.

Here, in a region other than an a-Si TFT part, namely a region in which a gate electrode 26 is present under the semiconductor layer 19, the semiconductor layer 19 becomes a floating state and cannot perform control, so that a leak of the semiconductor layer 19 causes a problem. As a result of that, in a configuration in which the data line 18 and the drain electrode 21 are connected to the source electrode 20 in a region in which the gate electrode 26 is absent, electric charge held in the pixel electrode 24 escapes due to the leak of the semiconductor layer 19, so that the configuration is not preferable.

Hence, in the region in which the gate electrode 26 is absent, the patterning of the passivation film 28 is performed so as to separate the semiconductor layer 19 under the source electrode 20 from the semiconductor layer under the data line 18 and the drain electrode 21.

Also, in order to prevent a short in the gate line 17 and the data line 18, a semiconductor pattern is increased more than a pattern of the data line, the drain and source electrodes.

Also, all the gate insulating film 27, the semiconductor layer 19 and the passivation film 28 over the gate line 17 (other than the a-Si TFT part) are removed and after the removal, covering and protection are performed by the overcoat layer. This overcoat layer has a function of covering bumps of the TFT substrate to perform planarization and also a function of protecting the gate line 17 and protecting the end of the semiconductor layer to suppress a side leak of the a-Si TFT 16.

According to this invention thus, after forming the gate electrode on the transparent insulating substrate, the gate insulating film and further the semiconductor layer are formed on the whole surface and the drain electrode is patterned thereon and the passivation film is formed thereon and thereafter separation of a transistor region and formation of the contact through-hole are performed simultaneously.

That is, by integrating photolithography steps for forming a passivation film, an island and a contact into one step, a step for forming a planarization layer or a step for forming a color filter layer or an overcoat layer can be reduced, so that manufacturing steps do not become complicated and a decrease in productivity is not caused.

Therefore, an active matrix type liquid crystal display device of organic interlayer separation type, color filter on TFT (COT) type or reflection type capable of improving performance of a liquid crystal display device by providing an organic insulating layer on an active matrix substrate can be manufactured at low cost and high throughput.

As described above, according to this invention, a transistor substrate for liquid crystal display device formed by stacking a gate electrode, a gate insulating film, a semiconductor layer, a source electrode, a drain electrode and a passivation film on a transparent insulating substrate has a structure in which the semiconductor layer under the source electrode is separated from the semiconductor layer under data line and the drain electrode, so that a liquid crystal display device for providing an organic insulating layer on a transistor substrate to improve performance can be manufactured by a smaller manufacturing steps in number and productivity can be improved.

Also, the above-mentioned transistor substrate for liquid crystal display device can be implemented by a manufacturing method of a transistor substrate for liquid crystal display device according to this invention.

It is apparent that the present invention is not limited to the above embodiments, but may be modified and changed without departing from the scope and sprit of the invention.

What is claimed is:

1. A liquid crystal display device, comprising:
    a plurality of pixels arranged in a matrix form, each of said pixels comprising:
        a pixel electrode formation area wherein a pixel electrode is formed; and
        a thin film transistor formation area wherein a thin film transistor is formed and connected to said pixel electrode, said thin film transistor comprising:
            a semiconductor layer serving as a channel;
            a terminal formed to be connected to said pixel electrode;
            an inorganic insulating a passivation layer formed to cover said thin film transistor; and
            a transparent organic insulating layer covering said passivation layer, wherein said pixel electrode formation area comprises a plurality of prism-shaped base posts, and an uneven layer formed on said plurality of prism-shaped base posts, wherein said semiconductor layer extends from said channel toward said pixel electrode formation area beyond said terminal and terminated in said pixel electrode formation area to form a termination end that is aligned with a termination end of said passivation layer, and wherein said organic insulating layer covers said termination ends of said semiconductor layer and said passivation layer.

2. The device as claimed in claim 1, wherein said pixel electrode is connected to said terminal of said thin film transistor through a contact hole that is selectively formed in said organic insulating layer and said passivation layer.

3. The device as claimed in claim 1, wherein said uneven layer covers said plurality of prism-shaped base posts and is formed between said plurality of prism-shaped base posts.

4. The device as claimed in claim 1, wherein said pixel electrode comprises a reflection-type electrode which is formed on said uneven layer.

5. The device as claimed in claim 1, wherein said pixel electrode comprises a shape which follows a contour of said uneven layer.

6. The device as claimed in claim 1, wherein said uneven layer comprises a transparent photosensitive resist.

7. The device as claimed in claim 1, wherein said pixel electrode comprises one of sputtered aluminum and sputtered silver.

8. The device as claimed in claim 1, further comprising:
a transparent insulating substrate, said plurality of prism-shaped base posts being formed on said transparent insulating substrate.

9. The device as claimed in claim 8, wherein said thin film transistor further comprises a gate insulation film formed on said transparent insulating substrate.

10. The device as claimed in claim 9, wherein said plurality of prism-shaped base posts comprise:
an insulation film formed on said transparent substrate;
a semiconductor film formed on said insulation layer; and
an inorganic insulating film formed on said semiconductor layer.

11. The device as claimed in claim 1, wherein said thin film transistor further comprises a drain electrode, said pixel electrode being connected to said drain electrode via a contact through hole formed in said uneven layer, and a contact through hole passing through said passivation layer.

12. The device as claimed in claim 1, wherein said organic insulating layer comprises a transparent acrylic resin.

13. A liquid crystal display device, comprising:
a plurality of pixels arranged in a matrix form, each of said pixels comprising:
a pixel electrode formation area wherein a pixel electrode is formed; and
a thin film transistor formation area wherein a thin film transistor is formed and connected to said pixel electrode, said thin film transistor comprising:
a semiconductor layer serving as a channel;
a terminal formed to be connected to said pixel electrode;
a passivation layer formed to cover said thin film transistor; and
an organic insulating layer covering said passivation layer,
wherein said pixel electrode formation area comprises a plurality of prism-shaped base posts, and an uneven layer formed on said plurality of prism-shaped base posts, wherein said semiconductor layer extends from said channel toward said pixel electrode formation area beyond said terminal and terminated in said pixel electrode formation area to form a termination end that is aligned with a termination end of said passivation layer, and wherein said organic insulating layer covers said termination ends of said semiconductor layer and said passivation layer, wherein said device further comprises:
a transparent insulating substrate, said plurality of prism-shaped base posts being formed on said transparent insulating substrate, wherein said thin film transistor further comprises a gate insulation film formed on said transparent insulating substrate, wherein said plurality of prism-shaped base posts comprise:
an insulation film formed on said transparent substrate;
a semiconductor film formed on said insulation layer; and
an inorganic insulating film formed on said semiconductor layer, and wherein said insulation film, said semiconductor film, and said inorganic insulating film are formed concurrently with a formation of said gate insulation film, said semiconductor layer and said passivation film in said thin film transistor, respectively.

14. A thin film transistor array substrate for a liquid crystal display device, said thin film transistor substrate comprising:
an insulating substrate;
a plurality of data lines formed on said insulating substrate;
a plurality of gate lines formed on said insulating substrate, such that areas bounded by said plurality of gate lines and said plurality of data lines define a plurality of pixels in said liquid crystal display device;
a plurality of thin film transistors respectively formed on said insulating substrate in said plurality of pixels;
a plurality of prism-shaped base posts formed adjacent to a thin film transistor in each of said plurality of pixels;
an uneven layer formed on said plurality of prism-shaped base posts, said uneven layer comprising a transparent organic insulating layer; and
a pixel electrode formed on said uneven layer,
wherein said thin film transistor comprises:
a gate insulation layer formed on said transparent insulating substrate;
a semiconductor layer formed on said gate insulation layer; and
an inorganic a passivation layer formed on said semiconductor layer.

15. The device as claimed in claim 14, wherein said plurality of prism-shaped base posts comprises:
an insulation film formed on said transparent substrate;
a semiconductor film formed on said insulation layer; and
an inorganic insulating film formed on said semiconductor layer.

16. The device as claimed in claim 14, wherein said uneven layer comprises a transparent acrylic resin and covers said passivation layer.

17. A thin film transistor array substrate for a liquid crystal display device, said thin film transistor substrate comprising:
an insulating substrate;
a plurality of data lines formed on said insulating substrate;

a plurality of gate lines formed on said insulating substrate, such that areas bounded by said plurality of gate lines and said plurality of data lines define a plurality of pixels in said liquid crystal display device;

a plurality of thin film transistors respectively formed on said insulating substrate in said plurality of pixels;

a plurality of prism-shaped base posts formed adjacent to a thin film transistor in each of said plurality of pixels;

an uneven layer formed on said plurality of prism-shaped base posts; and a pixel electrode formed on said uneven layer, wherein said thin film transistor comprises:
- a gate insulation layer formed on said transparent insulating substrate;
- a semiconductor layer formed on said gate insulation layer; and
- a passivation layer formed on said semiconductor layer, wherein said plurality of prism-shaped base posts comprises:
- an insulation film formed on said transparent substrate;
- a semiconductor film formed on said insulation layer; and
- an inorganic insulating film formed on said semiconductor layer, and wherein said insulation film, said semiconductor film, and said inorganic insulating film are formed concurrently with a formation of said gate insulation layer, said semiconductor layer and said passivation layer in said thin film transistor, respectively.

18. A method of forming a thin film transistor array substrate for a liquid crystal display device, comprising:

forming a plurality of data lines on a insulating substrate;

forming a plurality of gate lines on said insulating substrate, such that areas bounded by said plurality of gate lines and said plurality of data lines define a plurality of pixels in said liquid crystal display device;

forming a plurality of thin film transistors respectively on said insulating substrate in said plurality of pixels;

forming a plurality of prism-shaped base posts adjacent to a thin film transistor in each of said plurality of pixels;

forming an uneven layer comprising a transparent organic insulating layer on said plurality of prism-shaped base posts; and forming a pixel electrode formed on said uneven layer, wherein said forming said plurality of thin film transistors comprises:
- forming a gate insulation layer on said transparent insulating substrate;
- forming a semiconductor layer on said gate insulation layer; and
- forming an inorganic insulating a passivation layer on said semiconductor layer.

19. The device as claimed in claim 18, wherein said forming said plurality of prism-shaped base posts comprises:
- forming an insulation film on said transparent substrate;
- forming a semiconductor film on said insulation layer; and
- forming an inorganic insulating film on said semiconductor layer.

20. A method of forming a thin film transistor array substrate for a liquid crystal display device, comprising:

forming a plurality of data lines on a insulating substrate;

forming a plurality of gate lines on said insulating substrate, such that areas bounded by said plurality of gate lines and said plurality of data lines define a plurality of pixels in said liquid crystal display device;

forming a plurality of thin film transistors respectively on said insulating substrate in said plurality of pixels;

forming a plurality of prism-shaped base posts adjacent to a thin film transistor in each of said plurality of pixels;

forming an uneven layer on said plurality of prism-shaped base posts; and forming a pixel electrode formed on said uneven layer, wherein said forming said plurality of thin film transistors comprises:
- forming a gate insulation layer on said transparent insulating substrate;
- forming a semiconductor layer on said gate insulation layer; and
- forming a passivation layer on said semiconductor layer, wherein said forming said plurality of prism-shaped base posts comprises:
- forming an insulation film on said transparent substrate;
- forming a semiconductor film on said insulation layer; and
- forming an inorganic insulating film on said semiconductor layer; and wherein said forming said insulation film, forming said semiconductor film, and forming said inorganic insulating film are performed concurrently with said forming said gate insulation layer, forming said semiconductor layer and forming said passivation layer in said thin film transistor, respectively.

* * * * *